US007708128B2

(12) United States Patent
Giering et al.

(10) Patent No.: US 7,708,128 B2
(45) Date of Patent: May 4, 2010

(54) VALUABLE DOCUMENT AND METHOD AND DEVICE FOR EXAMINING SAID VALUABLE DOCUMENT

(75) Inventors: Thomas Giering, Kirchseeon (DE); Norbert Holl, Germering (DE); Christian Voellmer, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 971 days.

(21) Appl. No.: 10/499,206

(22) PCT Filed: Dec. 18, 2002

(86) PCT No.: PCT/EP02/14507

§ 371 (c)(1),
(2), (4) Date: Jan. 31, 2005

(87) PCT Pub. No.: WO03/054810

PCT Pub. Date: Jul. 3, 2003

(65) Prior Publication Data

US 2005/0121287 A1 Jun. 9, 2005

(30) Foreign Application Priority Data

Dec. 21, 2001 (DE) ................................ 101 63 265

(51) Int. Cl.

| | |
|---|---|
| ***G07F 7/04*** | (2006.01) |
| ***G06K 7/00*** | (2006.01) |
| ***G06K 9/00*** | (2006.01) |
| ***G07D 7/00*** | (2006.01) |

(52) U.S. Cl. .................. 194/207; 194/214; 250/559.09; 250/556; 250/557; 283/72; 283/90

(58) Field of Classification Search ................. 194/206, 194/207; 209/534; 283/72, 90; 359/465; 250/555–557, 559.09
See application file for complete search history.

(56) References Cited

U.S. PATENT DOCUMENTS 3,574,441 A 4/1971 Harris et al.

(Continued)

FOREIGN PATENT DOCUMENTS

CA 2294755 7/1998

(Continued)

OTHER PUBLICATIONS

Amitay, N., "Broad-Band Wide-Angle Quasi-Optical Polarization Rotators", *IEEE Transactions on Antennas and Propagation*, vol. AP-31, No. 1, Jan. 1983, pp. 73-76.

(Continued)

*Primary Examiner*—Jeffrey A Shapiro
(74) *Attorney, Agent, or Firm*—Rothwell, Figg, Ernst & Manbeck, P.C.

(57) ABSTRACT

The invention relates to a value document, such as a banknote (1), which includes one or more window zones (2A, 2B) with one for example optically active element each which rotates a polarization plane $P_0$ of polarized light $L_A$, $L_B$, penetrating the window zone by a defined angle. If such value documents are stacked and polarized light penetrates the superimposed window zones, the number of stacked value documents can be determined by way of the overall rotation of the polarization plane $P_A$, $P_B$. The overall nominal value of a stack of banknotes can thus be determined. The window zones can have category-specific rotational characteristics for different categories or nominal values and/or can be disposed in category-specific positions in the valuable document.

34 Claims, 4 Drawing Sheets

U.S. PATENT DOCUMENTS

| | | | | | |
|---|---|---|---|---|---|
| 5,316,900 | A * | 5/1994 | Tsujioka et al. | 430/270.15 |
| 5,595,955 | A * | 1/1997 | Chang et al. | 503/201 |
| 5,678,863 | A * | 10/1997 | Knight et al. | 283/113 |
| 5,892,239 | A * | 4/1999 | Nagase | 250/556 |
| 6,032,779 | A * | 3/2000 | McAlister et al. | 194/206 |
| 6,062,604 | A | 5/2000 | Hardwick et al. | |
| 6,648,221 | B2 * | 11/2003 | Thawley et al. | 235/379 |
| 6,991,260 | B2 * | 1/2006 | Fan et al. | 283/72 |
| 7,032,828 | B2 * | 4/2006 | Krul et al. | 235/492 |
| 7,040,664 | B2 * | 5/2006 | Taylor et al. | 283/72 |
| 2002/0117845 | A1 * | 8/2002 | Ahlers et al. | 283/72 |

FOREIGN PATENT DOCUMENTS

| | | | |
|---|---|---|---|
| DE | 197 29 918 | A | 1/1999 |
| DE | 197 37 618 | A1 | 3/1999 |
| DE | 100 22 996 | A | 11/2001 |
| EP | 0 318 770 | A1 | 6/1989 |
| GB | 2 283 455 | A | 5/1995 |
| JP | 2000255200 | A | 9/2000 |
| JP | 2000318399 | A | 11/2000 |
| JP | 20001039100 | A | 2/2001 |
| JP | 2001071699 | A | 3/2001 |
| JP | 20001071700 | A | 3/2001 |
| WO | WO 98/15418 | A1 | 4/1998 |
| WO | WO 00/13065 | A1 | 3/2000 |

OTHER PUBLICATIONS

Zientek, P., “Polymeric Self-Authenticating Banknotes”, *SPIE*, vol. 3314, 1998, pp. 272-274.

* cited by examiner

VALUABLE DOCUMENT AND METHOD AND DEVICE FOR EXAMINING SAID VALUABLE DOCUMENT

CROSS-REFERENCE TO RELATED APPLICATIONS

This application is a National Phase of International Application Ser. No. PCT/EP2002/014507, filed Dec. 18, 2002.

FIELD OF THE INVENTION

The invention relates to a method for testing of documents of value, such as the determination of authenticity, number and/or category of banknotes, as well as documents of value adapted to same and an apparatus for carrying out the method.

DESCRIPTION OF THE BACKGROUND ART

Documents of value within the meaning of the present invention are particularly understood to mean documents of value with a predetermined nominal value, thus in particular banknotes, but also shares, postage stamps and the like. The invention is also applicable to other documents of value without a nominal value, such as checks, credit cards, ID cards, etc. and is suited in particular for the classification and quantity determination of such documents of value with no nominal value. In the following, the invention is described by way of example with reference to the particular problems encountered in banknote processing.

SUMMARY OF THE INVENTION

Determination of the authenticity and/or the category and/or the nominal value of banknotes is effected inter alias on the basis of different, automatically detectable banknote features, for example, on the basis of the printed image, the coloration, the dimensions, the labeling and the like, which features are usually designed such that they are nominal-value-specific. In this context, e.g. the determination of total nominal value of a stack of banknotes is elaborate, since, particularly in the presence of banknote bundles with mixed denominations, the banknotes must be singled first, in order to be able to determine their respective nominal value.

The object of the present invention consists in proposing a new method for checking documents of value, which in particular can also be applied for simple evaluation of documents of value that are present individually or bundled, which can also be of different categories, such as banknotes of different nominal values. In addition, the object of the present invention consists in proposing both suitable documents of value and an apparatus for carrying out the method.

According to the invention, the documents of value are provided with a window area that a polarization element is assigned to, which element, by a defined angle, rotates a plane of polarization of light passing through the window area. This property is also referred to as rotational characteristic in the following. These window areas can be a component of one or several see-through windows in the document of value. In this context, an associated see-through window in the document of value can also comprise one or several such window areas.

The invention offers the particular advantage that, amongst other things, the number of a plurality of stacked documents of value can be determined exactly by polarized light being radiated through the window areas lying one on top of the other and the overall rotation of the plane of polarization being measured. Since the rotation of the plane of polarization is predetermined for a single document of value, the number and aggregate value of the stacked documents of value can readily be inferred from the measured total rotation. Moreover, a criterion for determining the authenticity of the document of value is hereby also given.

In this context, so-called “optically active” elements, which also exhibit a polarization-plane-rotating effect without outside electrical or magnetic fields, are preferentially used as polarization elements. These are e.g. crystal structures out of quartz, iron garnets and/or gallium garnets, sodium chlorate or sodium bromate. A polymer foil present in the window area has proven to be especially suitable as an optically active element. Polymeric, optically active elements, e.g. also in the form of polymer dispersed liquid crystals, are known to the expert. Such polymer foils can be manufactured inexpensively and with different polarization properties. The polymer foil can be integrated into the window area or, instead, the window area can be formed of the polymer foil itself. Techniques for embedding polymer foils in paper as windows are sufficiently known and readily integratable in manufacturing processes.

Alternatively, substances with a polarization-plane rotating effect induced through external electrical or magnetic fields can also be used as polarization elements. Application of the Faraday effect proves to be particularly advantageous in this regard. However, substances with circular birefringent effect, which either occurs of itself or is induced by external fields, can also be used. Thus, optically anisotropic substances can be used, which are irradiated along their optical axis in order to eliminate the natural birefringent effect.

Since the detected position of the plane of polarization basically varies between 0° and 180°, while the total rotation, though, can go far beyond 180° depending on the rotational characteristic of the window areas and the number of stacked documents of value, according to a preferred embodiment, the rotational characteristic of the window areas should be adjusted such that the actually measured rotation of the plane of polarization, which is in the range of 0° to 180°, permits an unequivocal statement about the number of documents of value contained therein for large stacks of documents of value as well.

If the rotational characteristic of the individual documents of value can be measured precisely e.g. to a few powers by the detector for measuring the rotation of the plane of polarization, and if the rotation angle for a single document of value is selected such that it does not have a small common multiple with 180°, the exact number and value of the banknotes can also be determined when a stack of banknotes with several banknotes is being measured.

Alternatively or additionally, a preferred embodiment provides that at least two window areas with different characteristics are provided. If, in this case, e.g. a separate light beam is radiated through one of the respective window areas one will be able to achieve, through suitable selection of the different rotation properties, that the respective rotations of the plane of polarization of the individual beams through the individual areas that are detected using measurement technology will be so far apart that it will be possible to reliably derive from same the number of documents of value even of thick stacks of documents of value.

Moreover, it is especially preferentially conceivable to take account of the light absorption during passage of the light through the window area or, as the case may be, the window areas when determining the number of the documents of value of the document-of-value stack. This is because the greater the number of the stacked documents of value is, the more light is absorbed, and comparison with a reference table then gives an indication of the number of the stacked documents of value.

An embodiment of the invention provides that documents of value, which belong to different categories of documents of value, possess different category-specific window areas, so that, from a group of documents of value, each document of value is identifiable according to its category.

In the case of documents of value with different nominal values, such as, for example, in the case of banknotes, the nominal value of the individual document of value and, in a single measuring process in particular, the aggregate value of a bundle of banknotes which also contains mixed nominal values can be determined in this manner. In the case of a check, for example, a distinction can be made between different check forms.

According to a preferred embodiment, the category-specific window areas differ from one another in that they are present relative to a reference corner or a reference edge at a category-specific position of the documents of value.

It is thereby ensured in an especially simple fashion, that it is immediately recognizable, whether there are documents of value of different categories in a stack of documents of value. This is because, under these conditions, a document of value of a certain document-of-value category would block the passage of light through the window area of a document of value of different document-of-value category within the same document-of-value stack. Such a document of value that has erroneously found its way into the document-of-value stack can then be removed and determination of the number of the stacked documents of value be performed. This approach is thus also particularly suitable for automatic counting and determination of value of bundles of documents of value.

Alternatively or additionally, the category-specific window areas preferentially differ from one another in that they possess a category-specific rotational characteristic by rotating a plane of polarization of light, which passes through, by a category-specific angle.

This can e.g. be achieved by selecting different materials for the different documents of value.

Dependent on the measured rotation, the category of the document of value can then be determined. The number and aggregate value of stacked documents of value, which either belong to the same or different categories, can also be determined in the above-described fashion on the basis of the total rotation. The rotational characteristics of the individual document-of-value categories should be matched such that the rotation, which is detected using measurement technology, can be assigned unequivocally to a certain number of stacked documents of value of the individual document-of-value categories. In this way, the total nominal value of a bundle of documents of value can thus e.g. also be determined with a single measuring process.

The variants mentioned above are again preferentially used for also measuring documents of value of one category. Accordingly, e.g. the rotation angles can be selected for the individual documents of value of different categories, like e.g. banknotes of different nominal values, such that they have no small common multiple in comparison to one another and/or in comparison to 180°, so that their number and value can also be determined exactly when measuring a stack with several documents of value. Alternatively or additionally, use of documents of value with at least two window areas or, as the case may be, consideration of the attenuation of the intensity of the light radiated through the window areas of the stack of documents of value is again possible as well.

If documents of value of different categories are present, in this case, the window areas can be present at the same position of the documents of value relative to a reference corner or reference edge. By e.g. a stack of such documents of value being aligned flush to this corner or edge, it becomes possible to achieve overlapping of the window areas of the individual documents of value of the stack in a simple fashion.

An especially preferred embodiment, with which the documents of value of a stack of documents of value can be determined both according to the category and according to the number within the same category, provides that documents of value of a group of documents of value possess one or more window areas at a category-specific position in the document of value and additionally possess further window areas, which, however, do not influence the plane of polarization of the light passing through, at such positions in the document of value, where the documents of value of other categories in turn possess window areas with category-specific positions.

It is thereby achieved that the light at all positions, where at least one document of value possesses a window area with a category-specific position, can penetrate the entire stack of documents of value, and the total rotation of the plane of polarization at each category-specific position is only influenced by documents of value of the same category. In this manner, an unequivocal statement about the number of documents of value of a certain category within a document of value stack can be obtained by means of the respective window area position and the rotation of the plane of polarization detected at this position by the use of measurement technology.

The document of value preferentially possesses at least four identical window areas with an optically active element at positions, for which the central longitudinal axis and the central transverse axis of the documents of value, which are usually rectangular, represent axial symmetry axes. It is thereby ensured that, independently of its position—be it lying on the front side or back side, be it upside down or not,—the document of value comes to rest with one of the four identical window areas over a correspondingly disposed detector for determining the position of the plane of polarization of the polarized light passing through the document of value.

The individual documents of value or the stack of documents of value can be transported over the detector continuously or intermittently. Then, it is expedient for the window areas in all of the documents of value to be disposed along a line in accordance with the direction of transport of the documents of value, independently of their number and independently of the document-of-value category, so as to be detected by the detector. The use of a single detector then already suffices to check all of the window area positions.

According to a further preferred embodiment, the banknotes are additionally provided with a polarizing filter. This filter can be used to check the polarization rotation of the polarization-rotating window areas. For this purpose, e.g. two banknotes are placed on top of another such that the polarization-rotating area of the one banknote is superimposed over the polarizing filter of the other banknote. Depending on the rotational position of the two areas with reference to one another, light passing through is blocked. In this manner, with regard to a check of the authenticity of the banknotes, it is simple to ascertain whether the window areas of the banknotes are a forgery in the form of a transparent foil without any optically active effect whatsoever. Since the polarization-rotating area of the banknote and the polarizing filter occupy different areas of the banknote surface, the two banknotes will preferentially have to be disposed such that they are offset in their outside contour to one another. However, this does not represent a problem for an authenticity check by hand.

As an alternative to the aforementioned, the authenticity of a single document of value can already be checked by the banknote to be checked being bent such that a polarization-rotating area and the polarizing filter of the same banknote overlap.

According to a further separate idea, e.g. the polarization-rotating window areas are designed as transmission filters, in particular as edge transmission filters, in the case of which the filter absorbs or, as the case may be, transmits is significantly more strongly above a limit wavelength than below the limit wavelength. A filter can also exhibit several such edges. If, in the case of documents of value of different categories, e.g. banknotes of different nominal values, the limit wavelengths are different, this can be utilized in a simple manner to check whether a banknote with a wrong nominal value is contained in a bundle of banknotes. Although, the limit wavelengths can also be in the visible spectral range, they will preferentially be in the infrared range. In this context, the window areas of the stacked banknotes, which window areas are disposed one on top of the other, are irradiated with light of a wavelength, which e.g. is only permeable for the transmission filter area of the banknote nominal value that is about to be tested. If the light is blocked during transmission, one can then consequently conclude that at least one banknote of another nominal value is present in the stack.

However, checking of the documents of value or stacks of documents of value can also be stationary. Then, the position of the particular window areas is not critical. However, several light sources for irradiating the individual window areas and, in particular, several detectors for detecting the position of the plane of polarization of the light passing through the window areas may perhaps be needed then.

In particular, in the case of such a stationary check, the apparatus can possess a positioning device in order to bring the documents of value, individually or stacked, into a defined, aligned position, in which the light is radiated vertically through the window areas of the documents of value. This positioning device will e.g. be designed such that the documents of value are inputted or, as the case may be, fed inclined and e.g. are aligned against a stop on account of their gravity.

BRIEF DESCRIPTION OF THE DRAWINGS

Further embodiments and advantages of the invention are explained with reference to the figures.

They show.

DETAILED DESCRIPTION OF THE INVENTION

Figure 1:
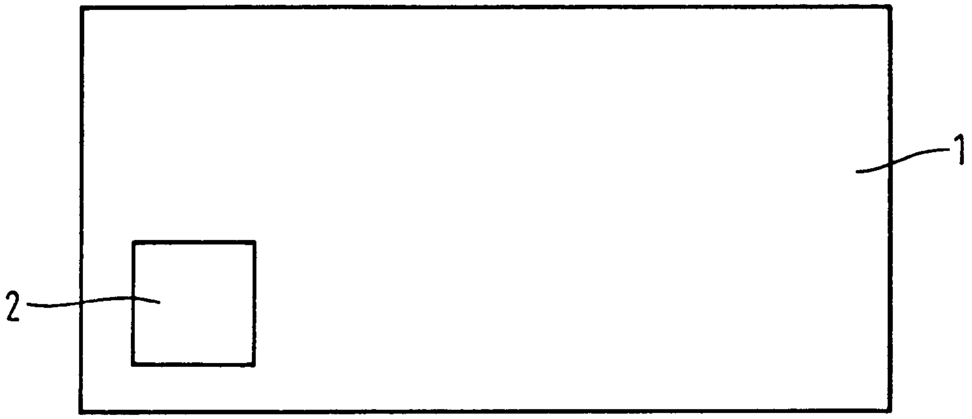
FIG. 1 a top view of a banknote with a window area according to the invention.
Figure 2:
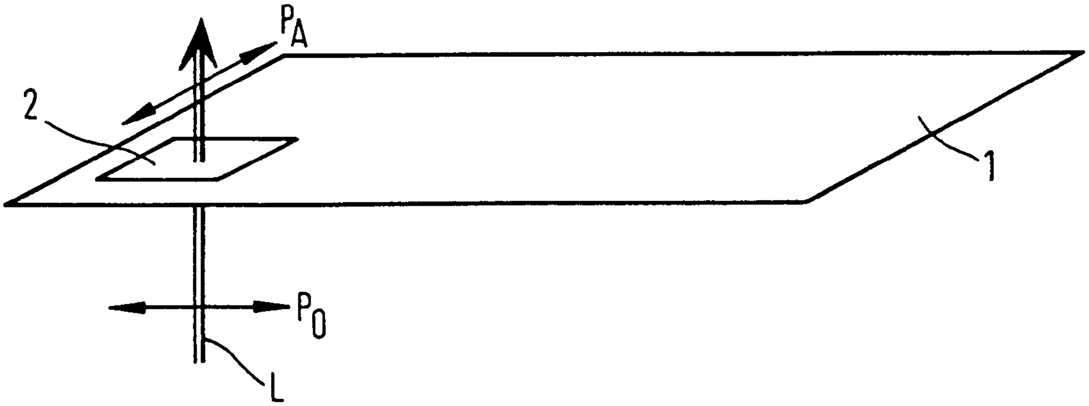
FIG. 2 a view in perspective of the banknote from FIG. 1 with the polarized light passing through the window area.

FIG. 1 shows a document of value 1, in particular a banknote, with a window area 2 with an optically active element as a polarization element. The optically active element is formed by a polymer foil that spans the entire see-through window 2. In this embodiment, polarization-plane rotating window area 2 thus corresponds to the total surface of see-through window 2, although it could alternatively also be present only in a partial area of the entire see-through window 2. Window area 2 is formed quadratically in the embodiment, but it can possess any desired form, in particular, also a round form. The window area, i.e. the optically active element forming the window area, causes a rotation of the plane of polarization of light passing through window area 2. This is shown in perspective in FIG. 2, where a linearly polarized light beam L, the polarizing angle of which is designated by an arrow marked with $P_0$, passes through window area 2, with the angular position of the plane of polarization of the light beam changing upon passage through window area 2 and then being marked with $P_A$. The rotation of the plane of polarization results at $P_0$ minus $P_A$ and is identical for all banknotes with the same nominal value. For example, the window areas can be adjusted such that the plane of polarization of banknotes with a nominal value of DM 10 is rotated by 3° and that of banknotes with a nominal value of DM 100 by 10°. This way, individual banknotes can be differentiated according to nominal value, with measurement of the rotation of polarization being able to be additionally used as a criterion of authenticity. In this case, however, it is not possible to differentiate between 10 stacked DM 10 banknotes and 3 stacked DM 100 banknotes, as the total rotation amounts to 30° in each case.

Figure 3:
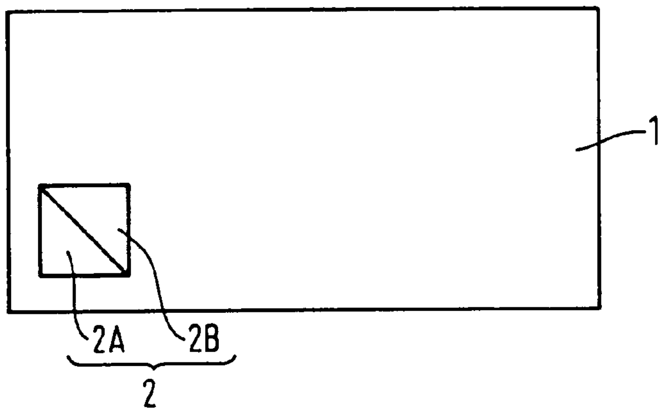
FIG. 3 a banknote according to FIG. 1, but with several window areas with different rotational characteristics.

FIG. 3 shows a further development of the banknote from FIG. 1, which possesses two window areas 2A, 2B with different properties. The plane of polarization of light, which passes through window area 2A, is rotated by a defined angle that is different from the plane of polarization of the light passing through window area 2B.

Figure 4:
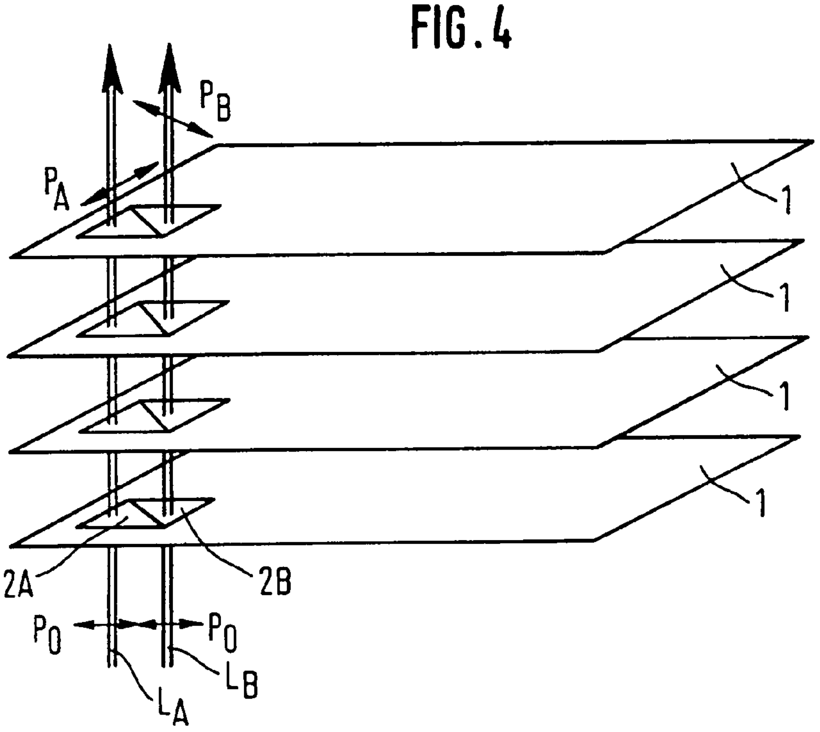
FIG. 4 a view in perspective of several stacked banknotes according to FIG. 3 with differently rotated, polarized light beams passing through the window areas.

In FIG. 4, this is depicted with reference to a stack of banknotes 10 with four banknotes 1 of the same denomination. This means that each of banknotes 1 possesses identical window areas 2A, 2B at identical places. The position of the plane of polarization of the two light beams $L_A$ or, as the case may be, $L_B$ passing through window areas 2A, 2B is identical prior to entry into the first banknote and marked with $P_0$ in FIG. 4. Upon exit from the last banknote, the plane of polarization of light beam $L_A$ that has passed through window areas 2A has rotated by an angle $P_A$ minus $P_0$, and the plane of polarization of light beam $L_B$ that has passed through window areas 2B has rotated by an angle $P_B$ minus $P_0$ differing from said angle.

Figure 5:
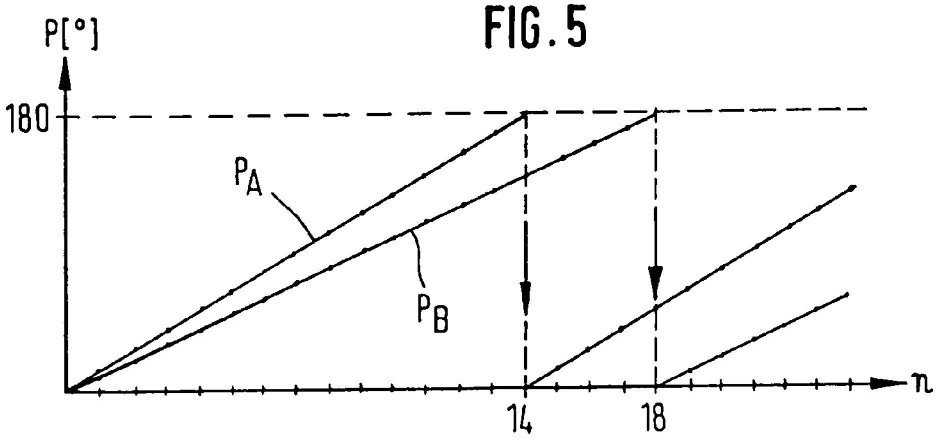
FIG. 5 a diagram-like depiction of the dependence of the rotation of the plane of polarization on the rotational characteristic and number of window areas through which the light passes.

This is expedient in order to reliably determine the amount of a larger number of stacked banknotes. The problems underlying the foregoing are explained with reference to FIG. 5 in the following. FIG. 5 shows the respective rotations P of the plane of polarization marked as $P_A$ or, as the case may be, $P_B$ for a stack of banknotes with window areas 2A and 2B in dependence on the number of banknotes n of the stack of banknotes. Accordingly, 14 window areas 2A stacked one on top of the other cause a rotation of the plane of polarization by precisely 180°, so that the number of banknotes in a stack of banknotes can only be determined precisely if the stack of banknotes contains 13 or fewer banknotes. The same applies to banknotes with window areas 2B, of which 18 banknotes stacked one on top of the other cause a rotation of the plane of polarization by 180°. Here, the maximum number of banknotes stacked on top of one another that can be determined unequivocally is 17. By now combining window areas 2A, 2B in a banknote and by the fact that, in their combination, they are specific for a certain banknote nominal value, this problem can be overcome, as the case where the rotation of the plane of polarization simultaneously amounts to 180° or, as the case may be, a multiple of 180° for both window areas only occurs for stacks of banknotes with an unrealistically large number of banknotes. For a stack of banknotes with a realistic number of banknotes, the combination of window areas 2A, 2B permits an unequivocal conclusion regarding the number and, in the case of banknotes with denomination-specific rotation characteristics, regarding the category of the stacked banknotes as well, so that the total denomination of the stack of banknotes can be determined.

Figure 6:
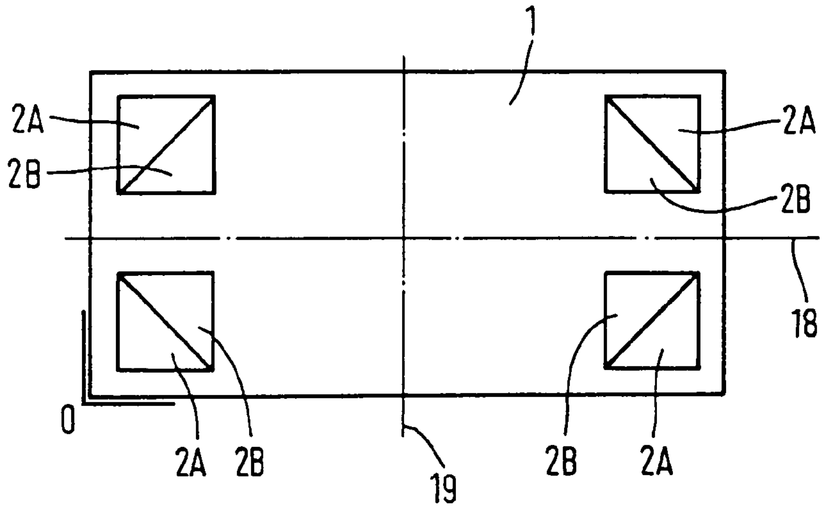
FIG. 6 a banknote according to FIG. 3, but with four identical, axially symmetrically disposed window areas.

FIG. 6 shows a further advantageous embodiment of the invention, according to which are provided four identical window areas 2A, 2B in a banknote 1, and according to which there is a window area 2A and a window area 2B in each corner of the banknote. The position of the window areas is selected such that longitudinal central axis 18 and transverse central axis 19 of banknote 1 represent axial symmetry axes for window areas 2A, 2B. Such a banknote can be aligned laterally reversed or upside down relative to reference point O, as shown in FIG. 6, and a window area 2A and a window area 2B always lies on a concrete point relative to reference point O. This has the advantage that detectors must only be provided at this concrete point to determine the position of the plane of polarization and that true-to-side positioning of the banknotes does not need to be considered during the check.

Figure 7:
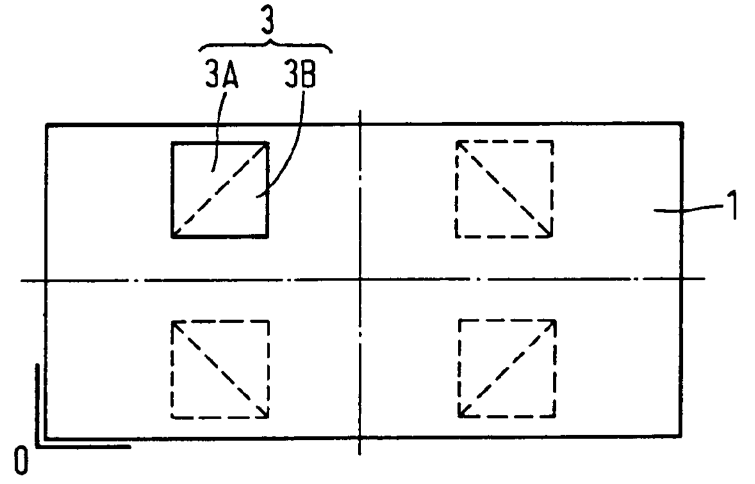
FIG. 7 a banknote with a different nominal value and window areas positioned differently from the banknote according to FIG. 6.

Whereas window 2 or, as the case may be, 2A, 2B can perfectly well be present at the same position within the banknotes for banknotes of different denominations and only differ as to their rotation characteristics, an alternative embodiment, depicted in FIG. 7, provides that the one window area or, as the case may be, window areas 3, 3A, 3B of a banknote, the denomination of which differs from that of the banknote depicted in FIGS. 1, 3 and 6, is present at a different position than window areas 2 or, as the case may be, 2A, 2B. The denomination or, as the case may be, the nominal value of banknotes can then be determined solely on the basis of the position of respective window areas 2 and 3 within the banknote. Preferentially, window areas 2, 3 can also exhibit a nominal-value-specific rotational characteristic in addition to their nominal-value-specific position. Beyond that, in banknote 1 depicted in FIG. 7 as well, window area 3 can be subdivided into window areas 3A, 3B with different rotational characteristics and/or be present in identical quadruplicate in the banknote, as indicated in FIG. 7 by chain lines in each case.

Figure 8:
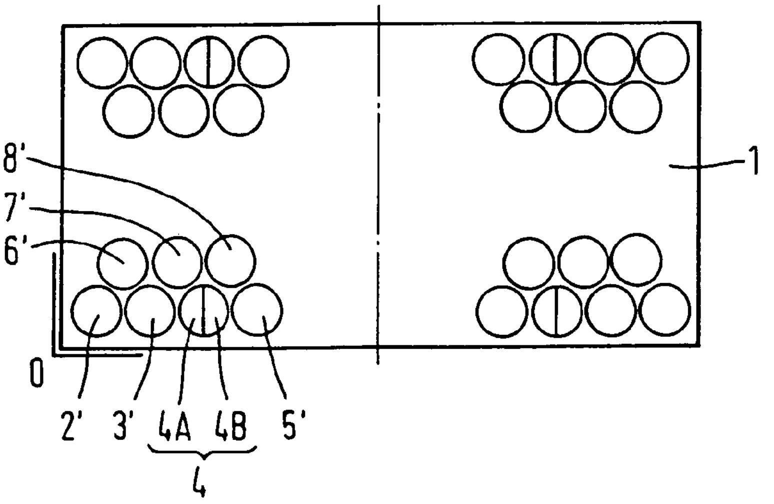
FIG. 8 a banknote with nominal-value-specific and non-nominal-value-specific window areas.

A special additional embodiment of the invention is depicted in FIG. 8 and shows a banknote 1 with several window areas in 2', 3', 4, 5', 6', 7', 8'. Only window area 4 exhibits a rotational characteristic and in the embodiment is formed by two window areas 4A, 4B with different rotational characteristics. The remaining window areas 2', 3' and 5' to 8' marked with ' are designed as a transparent foil without rotational characteristics. In other words, the plane of polarization of light that passes through these window areas is not influenced by the window areas without rotational characteristics. In the case of banknote 1 depicted in FIG. 8 as well, the window areas are again provided symmetrically in quadruplicate in order to permit orientation-independent checking of the banknote. Whereas the denomination of the banknote depicted in FIG. 8 can be determined on the basis of the rotational characteristic of window area 4, a correspondingly constructed banknote with a different nominal value could be determined on the basis of the rotational characteristic of another window area, and in this case, window area 4 would be designed as a transparent foil and marked with 4'. If one now stacks several banknotes, the window areas of which are disposed in accordance with the representation according to FIG. 8, but which possess different nominal values and, as a result, different window areas with rotation-angle characteristic properties, it will be possible to determine the banknote number present in the stack of banknotes for every banknote nominal value by checking every single window area position and use this result to determine the total nominal value of the stack of banknotes.

Figure 9:
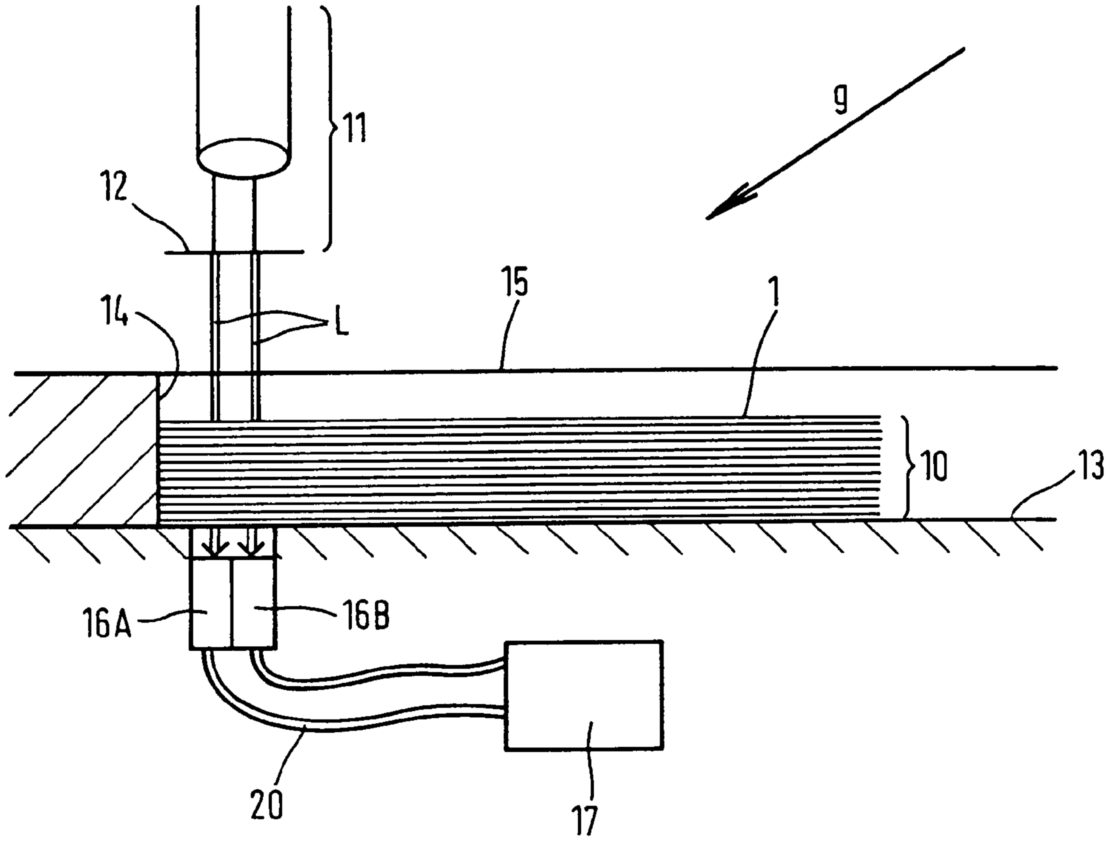
FIG. 9 an apparatus for determining the total nominal value of a stack of banknotes.

FIG. 9 shows an apparatus for stationary checking of a single banknote 1 or several stacked banknotes that can be employed in a banknote processing apparatus. The embodiment depicted in FIG. 9 is adapted, by way of example, to checking banknotes or, as the case may be, stacked banknotes according to FIGS. 3 and 4, the window area 2 of which is subdivided into two window areas 2A, 2B with different rotational characteristics. Beyond that, the window areas of the banknotes to be checked are positioned identically within the banknotes independently of their denomination, in order to ensure that the light beams passing through the stack of banknotes 10 are detected by detectors 16A, 16B. Light beams L are generated in a light source 11 and are polarized linearly by means of a polarizing filter 12. Alternatively, a laser can also be used as a light source for generating linearly polarized light. Stack of banknotes 10 lies on a receiving plane 13 serving as a device for receiving documents of value, and the edges of the individual banknotes of the stack of banknotes 10 run into stop faces 14 and 15, which are disposed at right angles to one another. As a result, the correct alignment of the banknotes with their window areas relative to light source 11 and detectors 16A, 16B is ensured so that light beams L hit detectors 16A, 16B vertically through the window areas. Alignment of the stack of banknotes 10 is preferentially effected independently through an inclined arrangement of the total apparatus as indicated by the gravity arrow g so that the banknotes independently lie flat against stop surfaces 14, 15 on account of the effect of gravity.

An evaluation device 17 is connected to detectors 16A, 16B via signal lines 20. From the angular positions of the planes of polarization of light beams L and the original position of the plane of polarization of light beams L, which is predetermined by polarizing filter 12, evaluation device 17 determines the angular amount, by which the plane of polarization has rotated due to the passage through the window areas. As explained previously, this is then used to determine the authenticity and/or nominal value and/or the number and/or the total nominal value of the banknote situated in the apparatus.

Detectors 16A, 16B can additionally be designed to measure the light intensity of the light detected, in order to be able to infer the number of banknotes situated on deposit plane 13. The evaluation of the light intensity value, in turn, is effected in evaluation device 17. Of course, additional detectors can also be provided for this purpose.

In this context, the embodiment depicted in FIG. 9 can be formed as a stationary variant where the banknotes are deposited on the deposit plane individually or as a bundle, e.g. also manually, and then measured as described hereinabove. Particularly in such a case as well, the apparatus can e.g. be a manual device or a tabletop device, which, for example, is used in banks, department stores or other places where larger quantities of banknotes accrue, in order to simply, quickly and reliably determine by means of a single measuring process the number of banknotes of each nominal value and, in particular, also the total number and aggregate value of banknotes of a banknote bundle.

Alternatively, this apparatus can also be designed with slight modifications as part of a banknote processing machine, such as of a sorter or an automatic teller, where e.g. the banknotes' authenticity and/or fitness for circulation are checked additionally on the basis of further banknote features. In this case in particular, the banknotes can also be transported individually or bundled through the measuring area between the light source and the detector by means of a transport apparatus.

As an additional embodiment of the aforementioned checking apparatus, this can e.g. comprise a non-depicted magnetic field generator that can generate a magnetic field, which runs parallel to the direction of propagation of light beam L in the area of receiving plane 13. In documents that basically do not exhibit a polarization-plane rotating effect, such an effect can hereby also be produced by means of the Faraday effect.

The invention claimed is:

1. Document of value comprising:

at least one window area; and a polarization element disposed in the at least one window area;

wherein, the polarization element rotates a plane of polarization of a linearly polarized light beam passing through the at least one window area, by a pre-defined angle, and wherein the angle is defined so that a plane of polarization of a linearly polarized light beam passing through window areas of several of said documents of value lying on top of the other is rotated by a corresponding multiple of the angle, and the polarization element is an element, which, induced by at least one of an outside electrical and magnetic field, rotates the plane of polarization of the polarized light beam passing through the associated window area by the defined angle.

2. Document of value according to claim 1, characterized in that the polarization element is an optically active element, which, even in the absence of at least one of an outside electrical and magnetic field rotates the plane of polarization of the polarized light beam passing through the associated window area by the defined angle.

3. Document of value according to claim 1, characterized in that the polarization element is an element, which, in the presence of a magnetic field that is parallel to the light beam, rotates the plane of polarization of the polarized light beam passing through the associated window area by the defined angle.

4. Document of value according to claim 1, characterized in that the polarization element is an optically anisotropic substance with an optical axis which runs perpendicularly to a surface of the window area.

5. Document of value according to claim 1, characterized in that the polarization element comprises a polymer foil present in the window area.

6. Document of value according to claim 1, characterized by several window areas, which rotate by different defined angles the plane of polarization of the polarized light beam passing through the associated window area.

7. Document of value according to claim 1, characterized in that the document of value possesses a central longitudinal axis and a central transverse axis and that four window areas are provided, for which the central longitudinal axis and the central transverse axis of the document of value form axial symmetry axes.

8. Document of value according to claim 1, characterized in that at least one of the window areas of the document of value possess a property that is specific for the category of the document of value.

9. Document of value according to claim 8, characterized in that the specific property includes that corresponding window areas rotate the plane of polarization of polarized light passing through by a category-specific angle.

10. Document of value according to claim 8, characterized in that the specific property includes that the elements of corresponding window areas are composed of a different material.

11. Document of value according to claim 8, characterized in that the specific property includes that corresponding window areas are present relative to a reference corner or reference edge of the document of value at a category-specific position of the document of value.

12. Document of value according to claim 11, characterized in that, in addition to a corresponding window area having a category-specific position, the document of value possesses one or more window areas, which do not rotate the plane of polarization of polarized light passing through, at such positions of the document of value, where documents of value of other categories in turn possess window areas with a category-specific position.

13. Document of value according to claim 8, characterized in that, in a case of documents of value of different categories, the window areas are present relative to a reference corner or reference edge of the document of value at the same position of the document of value.

14. Document of value according to claim 1, characterized in that the document of value exhibits a window area that acts as at least one of a polarizing filter and a transmission filter.

15. Method for checking at least one document of value characterized in that it has a polarizing window area, the method comprising:

radiating a beam of linearly polarized light through the window area of the document of value;

measuring an angle of rotation of the plane of polarization of the light beam passing through the window area;

performing a check in dependence on the measured angle of rotation of the plane of polarization; and wherein documents of value of a bundle of documents of value are stacked one on top of another such that window areas of individual documents of value lie one on top of another, the polarized light beam is radiated through window areas, which are disposed one behind another, of the documents of value, and at least one of a number, and category, and the total nominal value of all documents of value of said bundle is determined in dependence on the rotation of the plane of polarization.

16. Method according to claim 15, characterized in that, when the rotation of the plane of polarization is measured, at least one of an electrical and magnetic field is generated at least in an area of the document of value such that the polarization-plane rotation is induced in a polarization element that is present in a window area.

17. Method according to claim 16, characterized in that, when the rotation of the plane of polarization is measured, at least one of a magnetic field that is parallel to polarized light beam is generated at least in an area of the document of value.

18. Method according to claim 15 for determining at least one of a number and category of at least one document of value, characterized in that the document of value comprises a plurality of window areas with one element each, which rotate the plane of polarization of polarized light passing through an associated window area by different angles, with the polarized light beam being radiated through the plurality of window areas, the rotations of the plane of polarization of the light beam passing through the plurality of window areas being measured separately for each window and the number, category, a total nominal value of the documents of value or a combination thereof being determined in dependence on the measured rotations of the plane of polarization.

19. Method according to claim 18 for determining the number and category of stacked documents of value with different category affiliations, characterized in that all or at least part of the documents of value possess, additionally to a window area at a category-specific position, further window areas, which do not rotate the plane of polarization of polarized light passing through, at such positions of the document of value, where the documents of value with a different category affiliation in turn possess window areas with a category-specific position, with the polarized light beam being radiated through the window areas at different category-specific window-area positions, the rotations of the plane of polarization of the polarized light beam passing through the window areas being measured separately for each category-specific window-area position and the number and category of the stacked documents of value being determined in dependence on rotations of the plane of polarization measured for each category-specific window-area position.

20. Method according to claim 15, characterized in that light absorption when the light beam passes through said window area or is taken into account when a number of stacked documents of value is determined.

21. Apparatus for checking at least one of a number and category of stacked or individual documents of value comprising:

a document-of-value receiving device for receiving documents of value;

a checking device with at least one light source for radiating polarized light onto the document-of-value receiving device on one side of the document-of-value receiving device and with at least one detector for detecting, on another side of the document-of-value receiving device, polarized light sent out by the light source onto document-of-value receiving device, with the at least one detector being designed to detect the orientation of a plane of polarization of polarized light;

an evaluation device connected to the checking device via a signal line, which performs a check of one or more documents of value situated in the checking device in dependence on a rotation of the plane of polarization of the polarized light obtained on the basis of the orientation of the plane of polarization detected by the checking device; and wherein the document-of-value receiving device comprises a positioning device in order to bring documents of value into a defined, aligned position stacked.

22. Apparatus according to claim 21, characterized in that the checking device further comprises a field generation device in order to generate at least one of an electrical and magnetic field at least in an area of the document-of-value receiving device.

23. Apparatus according to claim 22, characterized in that the field generation device comprises a magnetic-field generation device, which generates, at least in the area of the document-of-value receiving device, a magnetic field which is parallel to the light radiated by the light source.

24. Apparatus according to claim 21, characterized in that the checking device comprises one or more light sources in order to, with a document of value with several window areas radiate light through different window areas, with the evaluation device performing a determination of at least one of a number and category of the document of value situated in the checking device in dependence on the rotations of the plane of polarization of the polarized light detected separately for each of the plurality of window areas by means of the checking device.

25. Apparatus according to claim 21, characterized in that the checking device is designed to detect the extent to which light is absorbed by the documents of value situated in document-of-value receiving device, and that the evaluation device performs the determination of a number of the documents of value in dependence on the detected light absorption.

26. Apparatus according to claim 21, characterized in that positioning device is disposed inclined relative to a horizontal position.

27. Apparatus for processing documents of value with an apparatus according to claim 21.

28. The document of value of claim 1, comprising a banknote.

29. The document of value of claim 14, wherein said filter is an edge transmission filter.

30. The method of claim 15 where said document of value is a banknote.

31. The method of claim 15 wherein said check is at least one of a determination of authenticity, a determination of number or a determination of a category of said document of value.

32. The apparatus of claim 21 wherein said documents of value are banknotes.

33. The method of claim 21 wherein said check is a determination of authenticity, a determination of number or a determination of a category of said documents of value.

34. The apparatus of claim 27 wherein said documents of value are banknotes.

* * * * *